May 3, 1966  A. B. LONG  3,249,227
CENTRIFUGAL SEPARATOR
Filed Nov. 6, 1961  2 Sheets-Sheet 1

INVENTOR.
ALFRED B. LONG
BY George L. Church
ATTORNEY

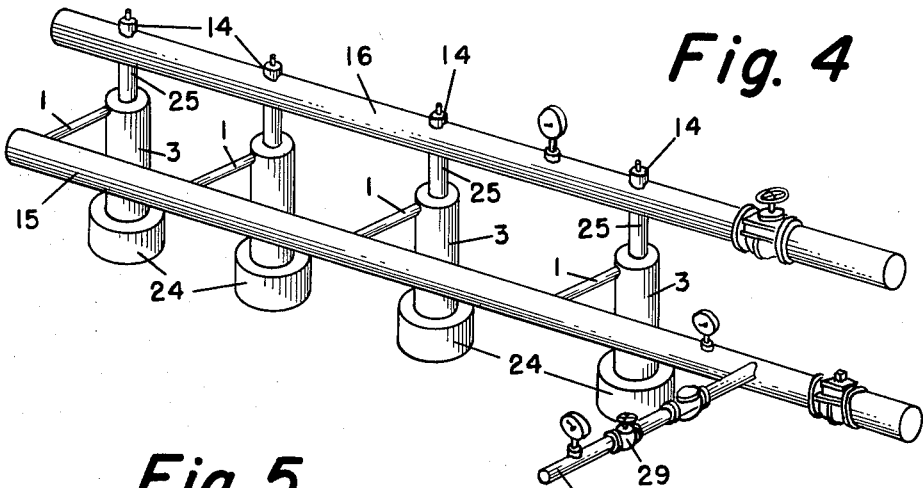
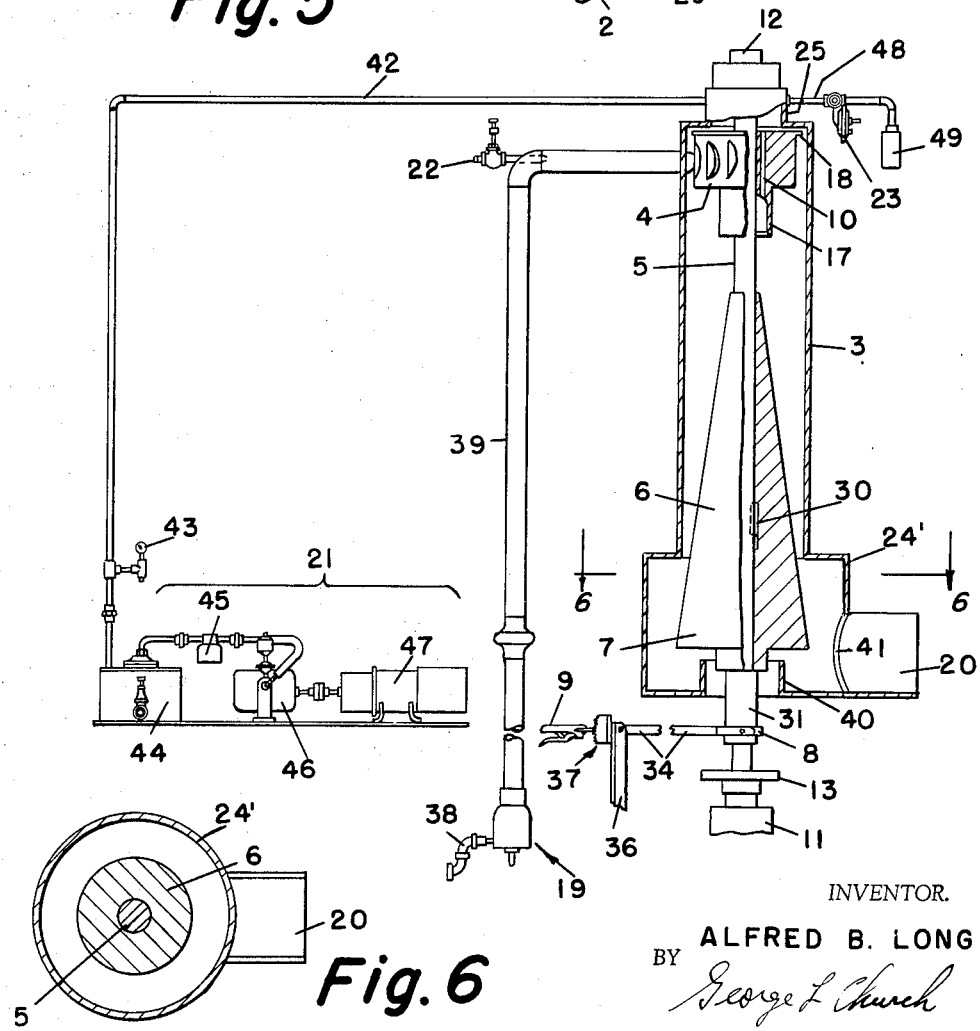

United States Patent Office 3,249,227
Patented May 3, 1966

3,249,227
CENTRIFUGAL SEPARATOR
Alfred B. Long, Beaumont, Tex., assignor to Sun Oil Company, Philadelphia, Pa., a corporation of New Jersey
Filed Nov. 6, 1961, Ser. No. 150,493
3 Claims. (Cl. 209—211)

This invention relates to the treating (mechanical processing) of slurries, and more particularly to a gravity accelerator device for the classification by specific gravity of solids in slurries and muds, of components of emulsions, and also for the degasification of drilling muds. It is suitable for use in the chemical, mining, and petroleum industries. It will be described herein, by way of example, for the treating of drilling mud, as used in oil well drilling by the rotary method.

The key to successful rotary drilling is not so much mechanical rotation of the drill pipe as it is keeping the hole clean of cuttings. There must be continuous operation, for the removal of drilled formation solids from the mud. There are several ways to accomplish this.

The primary device used for mud-solids separation is a shale shaker, or shale separator, which is usually a vibrating or rotating screen driven by an electric motor; separation takes place when the mud flows through the screen. However, it is not possible to remove fine particles by this method. Three other methods for controlling the solids are: dilution with water, sedimentation by quiescence in an extra rig mud tank (followed by the re-weighting of the mud with a high-specific-gravity material, usually barite), and the use of a centrifuge.

Solids play a very important part in drilling mud. For a given volume of a particular mud, there is a base cost. Thereafter, all mud money is spent for combatting contamination. The two primary sources of contamination are drilled solids, and chemicals such as salts from the formation. A numerical example of solids contamination will now be given, to point up the importance of the problem. A hole 15 in. in diameter has a volume of 21.7 bbls. per 100 ft. of hole. If formation shale has a specific gravity of 2.5 and weighs 875 lbs. per bbl. (equivalent to about 21 lbs. per gallon), then 100 ft. of hole drilled will produce close to 19,000 lbs. of shale. If one-half of this, or 9500 lbs., goes into suspension, it would be necessary to add one bbl. of water for each 120 lbs. of shale drilled, to maintain a mud weight of 9.8 lbs. per gallon. This amounts to 80 bbls. of water for every 100 ft. of hole.

Speaking somewhat generally, the control of drilling mud is accomplished by chemical and/or mechanical treatment. Materials or chemicals used may be classed as follows: base fluid (water), weighting agents (e.g., barites), lubricants, filtrate control agents, preservatives, defoamers, dispersants, shale inhibitors, flocculants, clays, and lost circulation materials. Of the three methods for controlling solids previously referred to, the first two are essentially chemical, while the last (to wit, the use of a centrifuge) is mechanical.

Economy is the compelling reason for using a centrifuge. High density drilling muds are very costly to compound and to maintain; a major consideration is the reduction of fine and/or low specific gravity solids which accumulate in the mud during normal drilling operations. The economy obtainable with the centrifuge is brought about in one or any combination of the following ways. First, the centrifuge maintains the same weighted properties closer and easier, with less chemicals. Weighting materials are conserved, and more water (which is relatively inexpensive) can be used as the chemical treatment.

Next, a low range solids mud, of a given weight, can be maintained with a centrifuge more economically than with any other means known. Faster penetration of the formation by the bit results from this type of mud. The risk of hole trouble is decreased, resulting in a less expensive drilling operation.

Also, the contrifuge may be used to salvage weight material (barite) from junk muds from old drilling locations, and it can be used to process any surplus mud from normal drilling operations. The building of "packer mud" from the normal drilling mud is made possible by a centrifuge. "Packer muds" are usually left in the casing annulus of a completed high-pressure oil or gas well.

The types of centrifuge devices which have previously been used on rotary drilling rigs, for the solids control of drilling muds, fall under two general classifications. One is known as a hydraulic cyclone, and the other as a decanter. In all centrifuges, solids separation is accomplished by gravity acceleration, or centrifugal force.

The hydraulic cyclone used for barite recovery in rotary drilling equipment is a cylindro-conical solids classification device, in which the flow inside the (inverted) cone has both a downward spiral next to the wall and an upward spiral at the center. These two high-velocity streams, flowing counter to each other, cause turbulence and eddy currents within the cone, so that it is not possible to make a "cut" at a definite point with such a device; that is, for a cone of given design, there will be a certain size particle that shows no preference for apex or vortex discharge. Another disadvantage of such a device is that the discharge at the cone apex must be of the right consistency, or it will "dry-plug"; therefore, improper adjustment of the auxiliary equipment will cause loss of all barite to the vortex discharge. This "right consistency" is another limiting factor in cyclone efficiency. However, unitized cyclones weigh only approximately 300 lbs., and the rig crew can install a cyclone unit without extra assistance.

The other basic type of centrifuge, a decanter, comprises a conical bowl rotated at high speed about a longitudinal axis, with a helical screw conveyor rotating within the bowl at a slightly slower speed, giving a relative rotary motion between the bowl and the conveyor. Although maximum control of the "cut" or separation point of the solids is possible with a decanter, such a device is extremely large and bulky (weighing approximately 4,000 lbs.), and is also rather expensive. Moreover, there is considerable expense involved in installing a decanter unit on a drilling rig, as the services of a dragline derrick are required.

It can thus be seen that a need exists for a machine (device) that has the advantages of both prior types.

An object of this invention is to provide a novel centrifuge for the solids classification of drilling muds.

Another object is to provide a novel centrifuge for solids classification which effects a maximum control or regulation of the "cut" or separation point of the solids.

A further object is to provide a new and improved centrifuge for solids classification which has a minimum of moving parts, is simple in design, and is able to hold its "cut" setting for long periods of operation, with minimum attention.

A still further object is to provide a novel centrifuge for solids classification whose physical dimensions and weight are comparable to those of the hydraulic cyclone.

The objects of this invention are accomplished, briefly, in the following manner: a turbine, driven hydraulically by the untreated mud or other untreated stock applied thereto, rotates a cone element within a stationary cylinder. This results in the classification of colloids, emulsions, slurries, etc. by differentials in specific gravities. The auxiliary equipment required is the same as for a hydraulic cyclone. With a slight modification, the same device is used for separating gas from gas-cut mud.

A detailed description of the invention follows, taken in conjunction with the accompanying drawings, wherein:

FIG. 4 illustrates a manifolding system involving several of the devices of FIG. 1;

FIG. 5 is a view similar to FIG. 1 but illustrating the device as used for the degassing of drilling mud; and FIG. 6 is a horizontal section taken along line 6—6 of FIG. 5.

Figure 1:
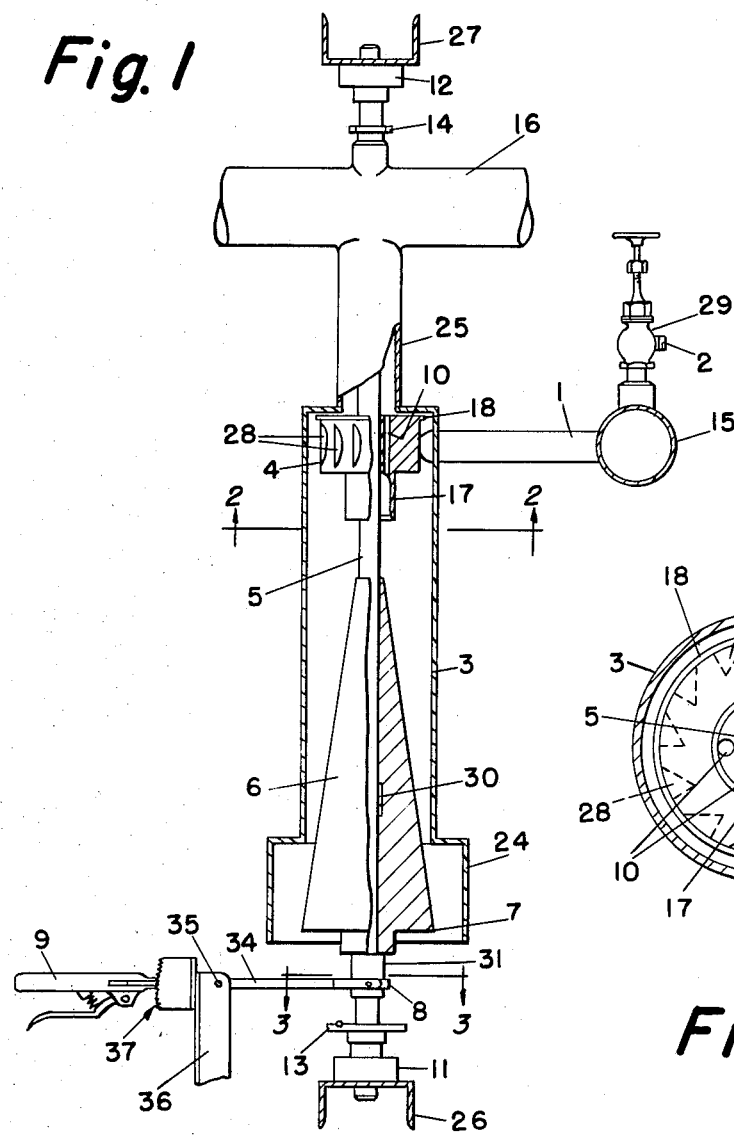
FIG. 1 is a vertical cross-section through a gravity accelerator device of the invention, as used for drilling mud solids classification.
Figure 2:
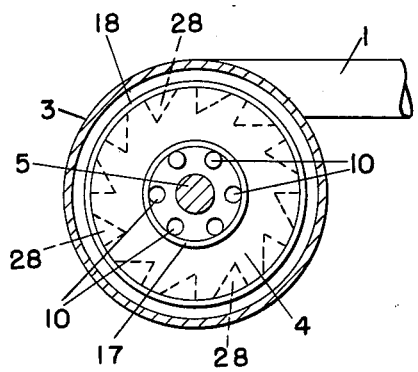
FIG. 2 is a horizontal section taken along line 2—2 of FIG. 1.

Referring first to FIGS. 1 and 2, a cylindrical housing 3, which is open at its lower end, carries a depending coaxial cylindrical skirt 24 of enlarged diameter; skirt 24 is integral with or attached to the lower end of housing 3. Housing 3 is supported from its upper end by means of a coxial pipe section 25 (of smaller diameter than housing 3) whose lower end is secured to the upper closed end of housing 3 and whose upper end is secured to a transversely-extending manifold pipe 16. Pipe section 25 communicates at its lower end with the upper end of housing 3, and at its upper end with pipe 16. As will later be explained, pipe section 25 conveys the low specific gravity slurry from housing 3 to pipe 16.

A shaft 5 is journaled for rotation centrally of housing 3, about an axis which is coincident with the longitudinal (vertical) axis of this housing. To support this shaft and to allow rotation thereof, two roller bearings 11 and 12 are employed. The lower bearing 11 is positioned at the lower end of shaft 5, and this bearing is supported in turn on a suitable fixed member or base (not shown) by means of a channel-iron support 26. Bearing 11 is protected from mud abrasion by means of a rotating slinger 13 positioned above this bearing and rotated by shaft 5. The upper end of shaft 5 (which extends centrally of pipe section 25) extends through pipe 16, transversely thereof, and through a manifold packing gland 14 at the upper side of this pipe, to the upper bearing 12. Bearing 12 is protected from mud abrasion by means of gland 14. Bearing 12 is supported from a suitable fixed member or support (not shown) by means of a channel-iron member 27.

A turbine wheel 4 is rigidly secured to shaft 5, at the upper end of housing 3. The body of this wheel is solid and is generally cylindrical in configuration, the wheel having an integral centrally-located depending cylindrical skirt 17 (of small diameter than the body of the wheel) which extends downwardly from the lower end of the wheel body. A plurality (six in number, for example, of equiangularly-spaced, vertically-extending circular bores 10 are provided in the body of turbine wheel 4. These bores are centered on a base circle which is intermediate the outer surface of shaft 5 and the inner surface of skirt 17; see FIG. 2. Thus, the lower ends of the bores 10 open into the space inside skirt 17, and the bores communicate at their upper ends with the interior of pipe section 25. As will become apparent hereinafter, bores 10 serve as ports for the discharge of the low specific gravity slurry from housing 3 into pipe section 25.

At its upper end, the body of turbine wheel 4 is of slightly enlarged diameter, to provide a thin outwardly-extending edge 18 (i.e., extending outwardly with respect to the remainder of the wheel body) the purpose of which will be explained hereinafter.

A plurality of equiangularly-spaced recesses or pockets 28 are cut into the cylindrical outer surface of the body of wheel 4, to provide in effect blades for this turbine wheel.

A water supply pipe 2, having a control valve 29 therein, provides water for dilution purposes to a raw or untreated mud manifold pipe 15, and from pipe 15 a diluted raw or untreated mud feed pipe 1 extends to the interior of housing 3. The axis of pipe 1 is approximately in the horizontal midplane of the body of turbine wheel 4. The axis of pipe 1 lies in a plane at right angles to the longitudinal axis of housing 3, and the housing end of this pipe is joined to the housing in a tangential direction, so that the diluted raw material or untreated mud is fed or injected tangentially into housing 3, near the top thereof, by means of pipe 1.

The diluted raw mud, fed tangentially into housing 3 at a high velocity, strikes turbine wheel 4 substantially tangentially, causing rotation of this wheel and also of shaft 5, to which wheel 4 is secured.

Figure 3:
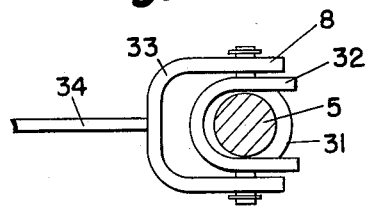
FIG. 3 is a view taken along line 3—3 of FIG. 1, showing a detail.

A member 6, having a continuous conical outer surface, is keyed as at 30 to shaft 5, so as to rotate therewith. The keying 30 is loose in the direction of the shaft, whereby to permit a limited amount of movement (adjustment) of the conical member 6 along the shaft, that is, in the direction of the axis of housing 3 (the vertical direction in FIG. 1). A pivoted clutch collar arrangement 8 (shown in detail in FIG. 3), one U-shaped member 32 of which extends into a pair of oppositely-disposed slots provided in a lower integral tubular extension 31 of cone 6, below the base 7 of the cone, permits vertical adjustment of the cone along the shaft 5, while freely permitting rotation of the cone along with shaft 5. The clutch collar arrangement 8 also includes another U-shaped member or yoke 33 which is pivotally connected to member 32 and is rigidly secured to one end of a link member 34 which is pivotally mounted at 35 on a fixed support 36. An adjustment handle or operating handle 9 is fixedly secured to the other or outer end of link 34. It can be seen that by moving handle 9 up or down, corresponding vertical movements of cone 6 on shaft 5 are effected. A spring-loaded dog-and-tooth mechanism 37 allows handle 9 (and link 34) to be locked in any desired, adjusted position, thereby to lock cone 6 in any desired position (within its range of adjustment or movement, of course) along shaft 5.

The cone or conical member 6 is so located that the lower portion thereof extends through the lower open end of housing 3, this lower portion being within skirt 24. The diameter of cone 6 at its base 7 is slightly greater than the internal or inside diameter of cylindrical housing 3. It is pointed out that vertical adjustment of cone 6 on shaft 5 (the mechanism for which has been described in the preceding paragraph) varies the annular space between the outer surface of this cone and the inner wall of housing 3, at the lower end of this housing.

As previously stated, in FIG. 1 the gravity accelerator device of the invention is set up for solids classification or solids separation of drilling muds (which may be thought of as pumpable slurries). In operation for this purpose, the raw or untreated mud, coming from the mud pumps or from mud jets, is diluted with water (by means of the water supply pipe 2, feeding into the raw mud manifold 15) before being treated by the device of this invention, in order to physically separate the particles further and thus to make the solids separation easier. The raw mud, diluted with water, is injected into the upper end of housing 3 tangentially and at high velocity, by means of feed pipe 1. This mud impinges on the turbine wheel 4, causing this wheel to spin at a speed approximating that of the rotating fluid. It will be understood that the fluid rotates because it is injected tangentially and at high velocity into the cylindrical housing 3.

Thus in the region of wheel 4, the mud will be in turbulent flow with a high degree of particle dispersion. This dispersion, with the increased fluid phase, passes through a transition from turbulent flow into laminar flow due to gravity aceleration generated by reaction with cylindrical housing 3 and conical member 6. Further, expanding on the above, laminar flow is initiated as the mud enters cylindrical housing 3 by the forming of a laminar boundary layer on its wall. As the mud progresses downward, the boundary layer expands. A laminar boundary layer also forms on turbine skirt 17, both inside and outside. The same reaction takes place around rotating shaft 5 and conical member 6. Between these spinning or rotating areas is one of turbulent flow which is confined and controlled by the aforementioned areas of rotating laminar flow. As the turbulent area progresses into the protracted gravity acceleration field between cylindrical housing 3 and conical member 6, the slurry is concentrated and is in laminar flow.

Solids separation efficiency is highest with laminar flow. Solids separation or classification is accomplished by means of gravity acceleration, or centrifugal force. The internal fluid rotation (previously described) raises the energy level, resulting in gravity acceleration. Classification of the solids (mud components) is effected by differentials in specific gravity.

The high specific gravity solids (barite materials) move to the inner cylindrical wall of housing 3 and progress straight down, moving down through the lower open end of this housing (and through skirt 24) to be discharged back into the rig mud system. This high specific gravity material flows through the annular space between cone 6 and housing 3, at the lower end of this housing, which annular space can be varied or adjusted by means of adjustment mechanism 9, 34, etc. (as previously described). Thus, this adjustment mechanism allows variation of internal pressure, retention time, and discharge rate of the high specific gravity, large particle material (solids).

Low specific gravity, fine particle material (solids) "climbs" the rotating cone 6 toward the center, where there is zero gravitational force, due to centripetal force. It will be recalled that cone 6 is rotated by turbine wheel 4, by way of shaft 5. The effluent (slurry) passes upwardly through the skirt 17 and the turbine wheel discharge ports 10 into pipe section 25, and thence into the low-specific-gravity-material (slurry) manifold pipe 16. The light, undesirable clay suspension is conducted by pipe 16 to a waste pit.

The downwardly-extending skirt 17 of the turbine wheel 4 prevents turbulent and eddy currents in the vicinity of the point of fluid impingement on the wheel from causing loss of high specific gravity materials out of the vortex (which is the upper central region of the housing). Also, the inside wall of this (rotating) skirt acts to maintain the effluent spinning at a speed comparable to that of the turbine. This results in reduced fluid shear, providing for more efficient passage of the effluent (slurry) through the discharge ports 10 in the turbine.

The outwardly-extending edge 18 at the top of the turbine wheel 4 prevents loss of raw, untreated fluid over the top of the wheel.

By way of example, during operation the turbine wheel, shaft, and cone may rotate at a speed on the order of 2,000 r.p.m.

It is pointed out that the device of FIG. 1 has a minimum of moving parts, is simple in design, and is able to hold its "cut" setting for long periods of operation with minimum attention; it effects a control or regulation of the "cut" comparable to that of a decanter, and yet its physical dimensions and weight are comparable to those of a hydraulic cyclone.

It has previously been stated that the pipes 15 and 16 are "manifold" pipes. Thus, several of the devices illustrated in FIG. 1 may be manifolded together or paralleled, to give increased slurry (mud) treating capacity. An arrangement of this type is illustrated in FIG. 4, to which reference will now be made. In this latter figure, four gravity accelerator solids classification devices are shown. The water supply pipe 2, controlled by valve 29, feeds water for dilution purposes into the raw mud manifold pipe 15. The four cylindrical housings 3, each of which is similar in construction to FIG. 1, are mounted vertically, in spaced parallel relation to each other. The manifold pipe 15 extends in a substantially horizontal direction along the row of housings, at a level even with the tops of the housings 3. From pipe 15, a separate feed pipe 1 branches off to each of the four housings, and each of the pipes 1 feeds diluted raw (untreated) mud to its respective housing in a tangential direction and at a high velocity, as previously described in connection with FIG. 1. In this connection, it is pointed out that raw mud is supplied at high velocity from a mud pump or mud jet to the right-hand (in FIG. 4) end of pipe 15.

In FIG. 4, the upper pipe sections 25 of all four devices are coupled to the low-gravity-material manifold pipe 16, which extends generally parallel to pipe 15 but directly over the axes of the housings 3. The coupling of each accelerator device to pipe 16 is effected in the manner previously described in connection with FIG. 1. Low-gravity materials (effluent or slurry) passing up through the respective pipe sections 25 are manifolded in pipe 16, which then carries such undesirable materials to a waste pit.

The gravity accelerator device of the invention may also be set up for the separation of gas from drilling mud, i.e. as a drilling mud degasser. Such an arrangement is illustrated in FIGS. 5 and 6, to which reference will now be made.

A mud jetting means 19, the operating pressure for which is supplied from a rig mud pump by way of a connection 38, picks up gas-cut mud from the rig mud tank and feeds it by way of pipe 39 into the cylindrical housing 3 in a tangential direction, causing the turbine-cone arrangement 4, 6 to rotate, just as in FIGURE 1.

The mud jet is significant in that it is necessary to increase the mass of the gas-cut mud in order to create sufficient energy to rotate turbine wheel 4. Pumps are very inefficient when handling gas-cut mud; therefore, a jet is the only practical means for flowing a large volume (8 to 12 bbls./minute).

Non-contaminated high-specific-gravity mud is used by jetting means 19 to move the gas-cut mud up pipe 39. This movement or flow is caused by the inter-fluid friction and pressure differential within pipe 39. As the mud flows up pipe 39, turbulence causes mixing and agitation. A minor portion of the small gas bubbles combine to form larger ones. Also, a certain degree of gas bubble compression takes place within the mud in pipe 39.

As this admixture enters cylindrical housing 3, decompression breaks the large bubbles, releasing gas. Some gas release also occurs when impingement on turbine wheel 4 occurs and causes further bubble destruction. The major portion of the gas can only be released by gravity acceleration, as the remaining bubbles are of pin-point size and distributed throughout the body of the mud. The gas-mud separation results in a positive gas pressure within cylindrical housing 3.

In FIGURE 5, the depending skirt 24' (which is attached to or is integral with housing 3, and which extends downwardly from the lower end of such housing) is closed at its bottom, and the bottom closure thereof has a centrally-located re-entrant portion 40 surrounding a hole through which the tubular extension 31 and the shaft 5 project. At its bottom, skirt 24' has therein a circular aperture 41, and coupled to this aperture, on the outside of skirt 24', there is a discharge chute or trough 20. During operation, degassed mud flows out through aperture 41, and thence into trough 20, by way of which it returns to the drilling rig mud system.

In the degasser of FIGURE 5, the upper pipe section 25 is of different dimensions than in FIGURE 1, and one end of a conduit 42 is coupled into pipe section 25. Conduit 42 leads to a pressure differential or vacuum system 21, the purpose of which is to increase the pressure differential within the housing 3, and to discharge the gas extracted from the mud at higher rate. The vacuum system 21 comprises a gauge 43, a moisture or fluid rap 44, a filter 45, and a vacuum pump 46, driven by an electric motor 47.

Means is provided for cleaning the degasser by flushing it with water. This means comprises a water jet 22 which opens into pipe 39, at approximately the level of the turbine wheel 4 (top of housing 3); this water jet may be turned on to wash the unit internally. The unit is washed whenever it is taken out of service.

One end of a pipe 48 is coupled into pipe section 25, and an air intake member 49 is coupled to the other end of pipe 48. A regulator valve 23 is coupled into pipe 48. The arrangement 23, 48, 49 operates to maintain the vacuum in housing 3 at a predetermined pressure differential or value, by admitting air when this is exceeded. This is necessary due to the variation of the amount of gas extracted from the mud.

The principle of operation of the degasser of FIG. 5 is substantially the same as discussed above in connection with FIG. 1, with the addition of a gaseous pressure differential, which creates an increased force. The gas-cut mud is jetted and mixed into the housing 3 tangentially, causing the turbine-cone arrangement 4, 6 to rotate. The resulting force, due to gravity acceleration, causes a specific gravity separation. Gas-cut mud (lower in specific gravity) "climbs" up the rotating cone 6, by centripetal force, concentrating the gas into large bubbles. The increased pressure differential (vacuum) created by the vacuum system 21 assists in overcoming the surface tension of the mud surrounding these remaining bubbles. Gas is thus released, and this gas passes through pipe 42 and is discharged by vacuum pump 46 to the atmosphere. Degassed mud (now higher in specific gravity) moves down housing 3, and is returned via aperture 41 and trough 20 to the drilling rig mud circulating system.

Since less gravity acceleration is needed to degas mud (due to the greater specific gravity differential) than to effect the solids classification of mud, the rotational speed of the internal elements in the FIG. 5 degasser can be approximately only one-fourth that of the similar elements in the solids classification machine of FIG. 1. Further, the dimensions of the housing 3 and of the rotating components in FIG. 5 can be approximately eight times greater than the corresponding dimensions of the high-speed machine of FIG. 1.

Some operational details pertain only to the degasser setup of FIG. 5. Fluid level in the cylindrical housing 3 is controlled by varying the discharge volume of the mud jet 19, and by adjustment of the vertical position of the rotating cone 6 on shaft 5. The latter adjustment involves the same mechanisms (9, 34, etc.) as described previously in connection with FIG. 1. The setting of the regulator value 23 is also a factor in the fluid level control just mentioned.

Summarizing the operation of the degasser of FIG. 5, gas-laden or gas-cut mud (which may be thought of as an untreated slurry) returning to the surface mud system of a drilling well is reconditioned (i.e., treated to remove the gas therefrom) by a gravity acceleration machine. This machine includes the cylindrical housing 3 with the rotating turbine-cone arrangement 4, 6 therein, as described in connection with both FIGS. 1 and 5. The degassed or treated mud is returned to the drilling rig mud system, for re-use.

The invention claimed is:

1. In a device for treating slurries, a stationary, elongated, solely cylindrical housing; a conical member positioned axially of said housing with its apex upwardly disposed and mounted for rotation within said housing about its own axis and the housing axis, said member extending longitudinally into said housing from one end thereof for a substantial distance but terminating short of the opposite end thereof, said one end of said housing being open, to enable high specific gravity material to pass out of the housing by way of said open end; means for adjustably varying the position of said member along the housing axis, thereby to vary the annular space between the outer surface of said member and the inner wall of said housing, at said one end thereof; means for injecting untreated slurry into said opposite end of said housing in a substantially tangential direction and at a high velocity; means utilizing the flow of slurry into said opposite end of said housing for causing rotation of said member about its axis at a high angular velocity; and means for abstracting low specific gravity material from the axial region of said housing, at said opposite end thereof.

2. A device for treating slurries, comprising a stationary, elongated, solely cylindrical housing; a turbine wheel mounted for rotation inside said housing at one end thereof, said wheel having a passageway in the axial region thereof, to allow flow therethrough of low specific gravity material from the axial region of said housing, at said one end thereof; means for injecting untreated slurry into said one end of said housing in a substantially tangential direction and at a high velocity, the stream of slurry impinging on said wheel to cause rotation thereof; a conical member positioned axially of said housing with its apex upwardly disposed, said member extending longitudinally into said housing from the other end thereof for a substantial distance but terminating short of said one end thereof, said other end of said housing being open, to enable high specific gravity material to pass out of the housing by way of said open end; and means securing said wheel and said member together for rotation of said member by said wheel.

3. A device in accordance with claim 2, including also means for adjustably varying the position of said member along the housing axis, thereby to vary the annular space between the outer surface of said member and the inner wall of said housing, at said other end thereof.

References Cited by the Examiner

UNITED STATES PATENTS

| 2,081,668 | 5/1937 | Horton | 55—404 XR |
| 2,474,006 | 6/1949 | Maycock | 261—83 |
| 2,474,007 | 6/1949 | Maycock | 261—83 |
| 2,843,265 | 7/1958 | Rakowsky | 209—211 |
| 2,968,401 | 1/1961 | Sheldon | 209—144 |
| 2,996,187 | 8/1961 | Payne | 209—211 |
| 3,024,908 | 3/1962 | Ibing | 209—144 |

FOREIGN PATENTS 63,629  7/1949  Netherlands.

HARRY B. THORNTON, *Primary Examiner.*

RICHARD A. O'LEARY, F. W. LUTTER,
*Primary Examiners.*